F. P. SMITH.
DRY CLOSET.
APPLICATION FILED NOV. 23, 1904.
949,917.
Patented Feb. 22, 1910.
3 SHEETS—SHEET 1.
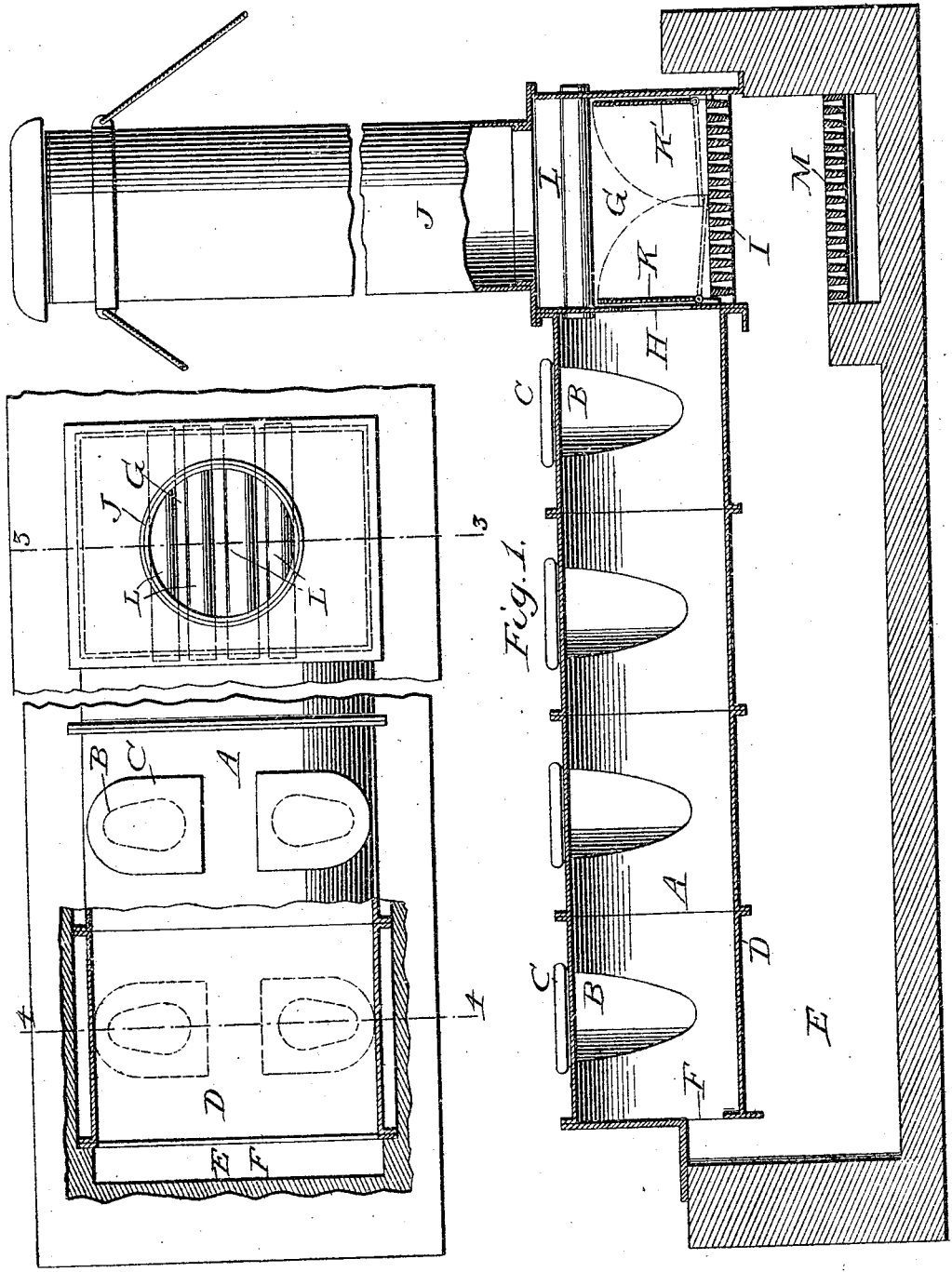

F. P. SMITH.
DRY CLOSET.
APPLICATION FILED NOV. 23, 1904.

949,917.

Patented Feb. 22, 1910.
3 SHEETS—SHEET 2.

Witnesses:
J. Stewart Rice
Fannie Wise

Inventor:
Fred P. Smith
By Dodge and Sons,
Attys

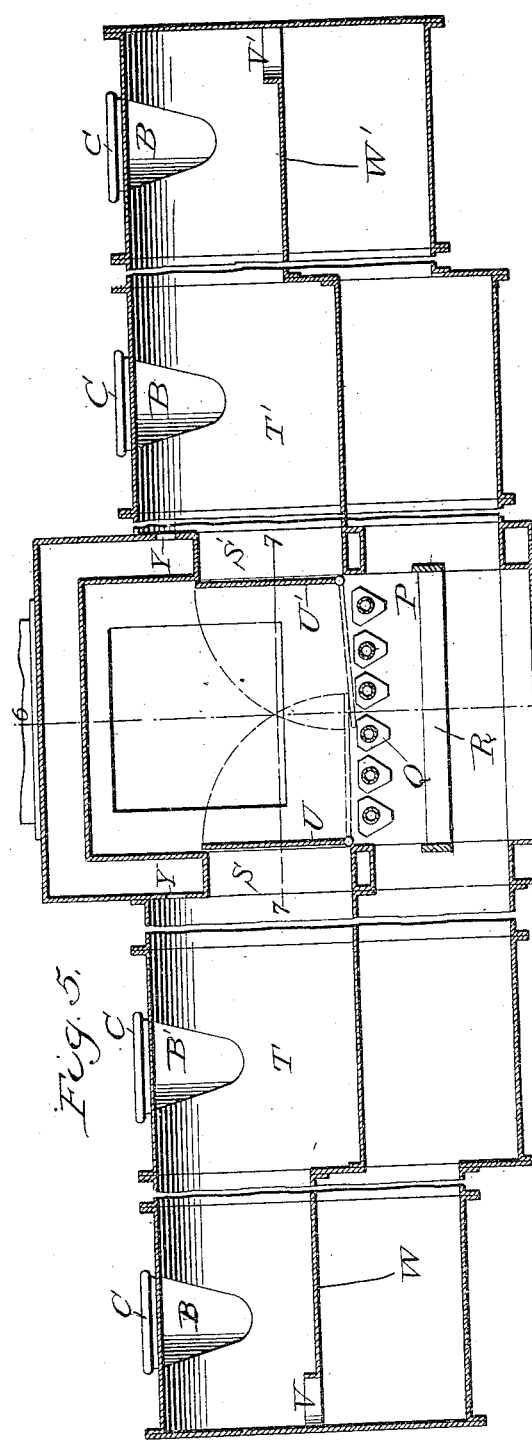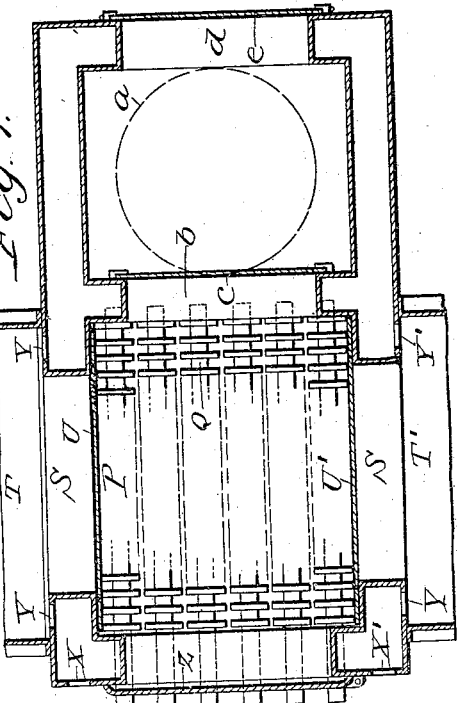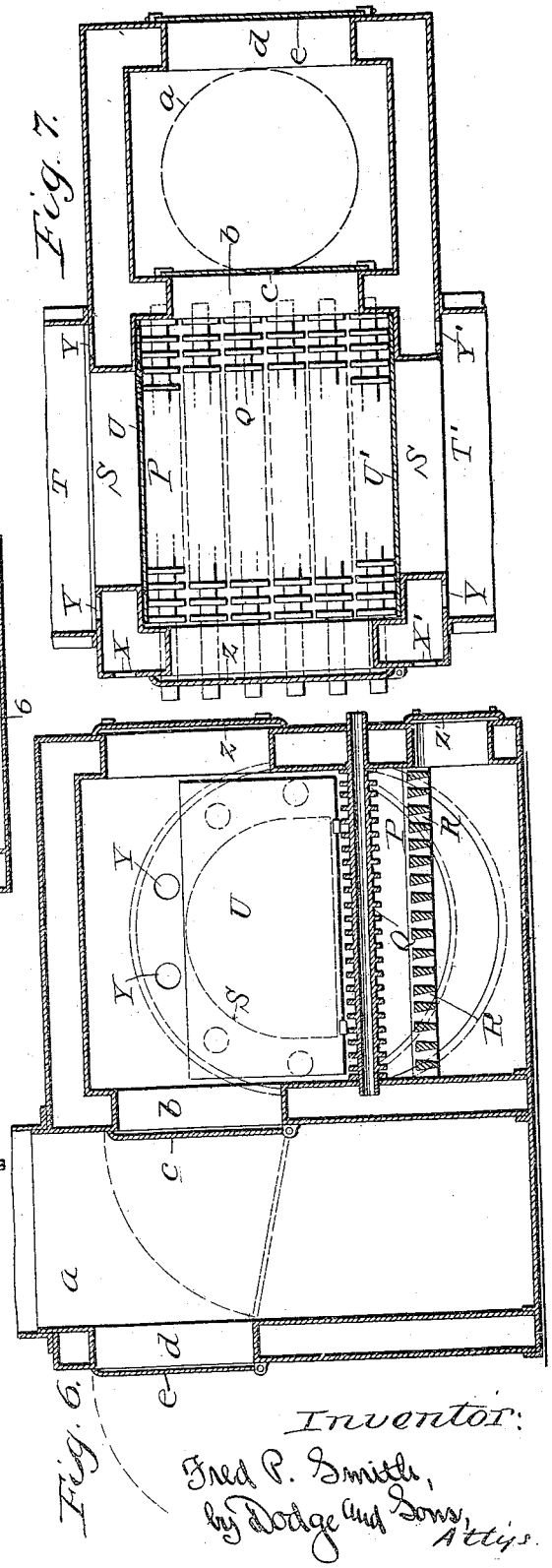

UNITED STATES PATENT OFFICE.

FRED P. SMITH, OF KANSAS CITY, KANSAS, ASSIGNOR OF ONE-HALF TO EDWARD C. LEWIS, OF CHICAGO, ILLINOIS, AND JOHN H. KITCHEN, OF KANSAS CITY, MISSOURI, COPARTNERS DOING BUSINESS AS LEWIS & KITCHEN, OF KANSAS CITY, MISSOURI, A FIRM.

DRY CLOSET.

949,917. Specification of Letters Patent. Patented Feb. 22, 1910.

Application filed November 23, 1904. Serial No. 234,083.

*To all whom it may concern:*

Be it known that I, FRED P. SMITH, a citizen of the United States, residing at Kansas City, in the county of Wyandotte and State of Kansas, have invented certain new and useful Improvements in Dry Closets, of which the following is a specification.

Figure 3:
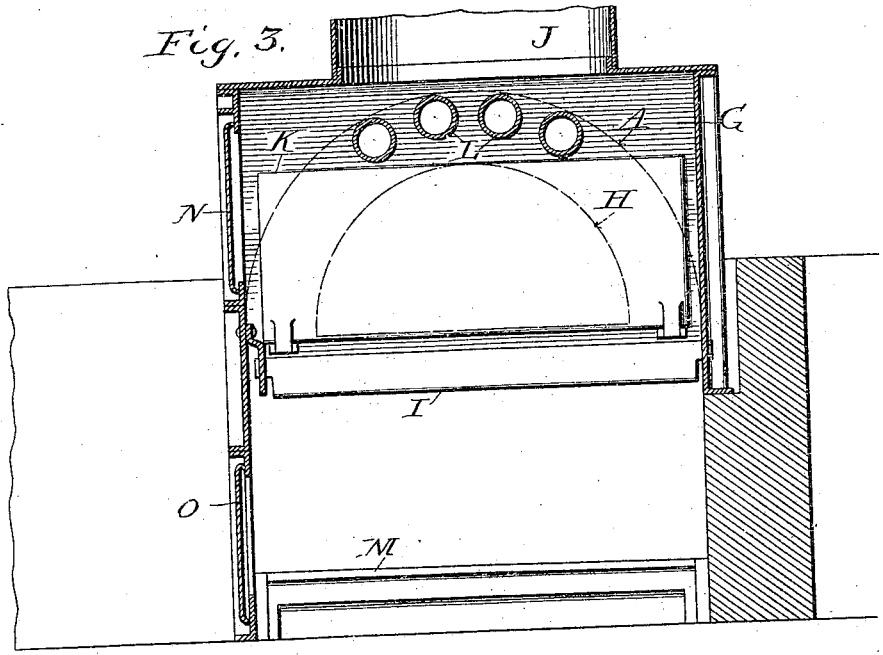
Figure 4:
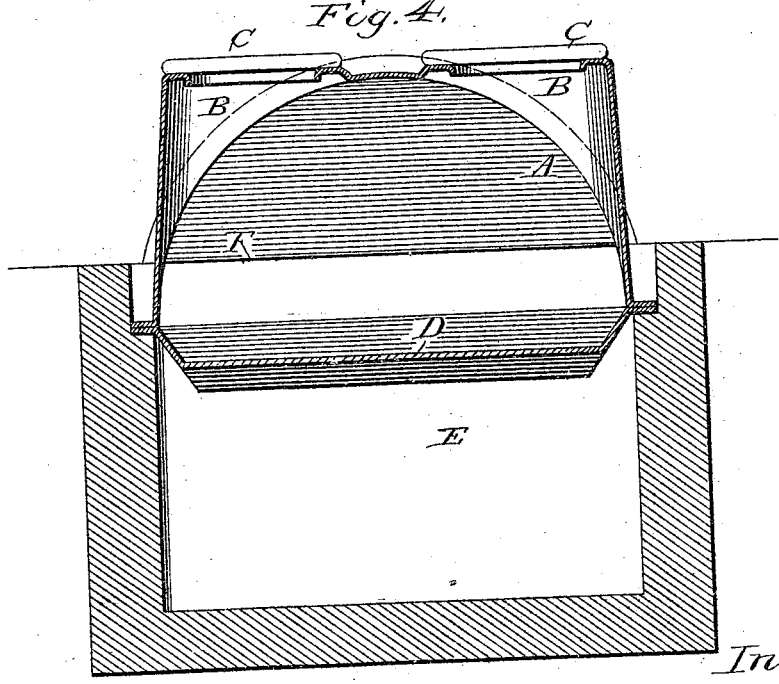

My present invention pertains to improvements in dry closets, the construction and advantages of which will be hereinafter set forth, reference being had to the annexed drawings, wherein:

Figure 1 is a longitudinal vertical sectional view of one form of the closet embodying my invention; Fig. 2 a top plan view, partly broken away; Fig. 3 a vertical sectional view, on the line 3—3 of Fig. 2; Fig. 4 a similar view, on the line 4—4 of Fig. 2; Fig. 5 a longitudinal vertical sectional view of a modified form of the apparatus; Fig. 6 a transverse sectional view, on the line 6—6 of Fig. 5; and Fig. 7 a plan view of the central portion of the apparatus.

The main object of the present invention is to provide an improved dry closet, in which a current of air is drawn into the apparatus over the excreta plate, the air being first caused to pass through heated conduits or passages, whereby its capacity to absorb moisture is increased, rendering its action upon the excreta more effective. Furthermore, entrance of flies into the apparatus is precluded, by reason of the fact that the only points of entrance, namely the air inlets, are hot.

A still further object of the invention is to provide means whereby the closet may be "back fired"; that is to say, the products of combustion may be caused to traverse the upper face of the excreta plate in a direction reverse to the natural draft of air thereover, and thereby thoroughly sterilize said plate and any excreta thereon.

Referring first to the construction shown in Figs. 1 to 4 inclusive, A denotes the main body of the apparatus, provided with a series of hoppers or openings B, which are normally closed by covers C. By preference, the body is composed of a series of sections bolted together, and the excreta plate or pan D, which underlies the hopper, is likewise formed of a series of units or sections also bolted together. As will be seen by reference to Fig. 4, the body and pan are provided with outwardly-extending flanges, the flanges of the pan resting upon the walls of the pit E or return-draft chamber over which the closet is located, the flanges of the body resting upon the flanges of the pan. The excreta plate stops short of the left-hand end of the pit, see Fig. 1, and a port or opening F forms a direct flue or passage between the excreta chamber above the excreta plate to the return-draft chamber, beneath the plate. At the opposite end of the pit is located a furnace, comprising a box-shaped body portion or firebox G, having a port or opening H, which communicates with the excreta chamber above the grate I of the furnace.

The furnace is surmounted by a stack J, and likewise provided with a pair of hinged doors or dampers K, K', which, when dropped, entirely cover grate I. When in their elevated position the grate is entirely free and the port or opening H is closed.

A series of tubes or pipes L extend through the upper portion of the fire-box, the outer ends of the tubes being open to the atmosphere, while the inner ends are in direct communication with the excreta chamber. These tubes form the air-inlet for the apparatus and of necessity any air which passes therethrough will be more or less heated, whereby its capacity to absorb moisture is increased. The tubes being hot will repel the entrance of flies.

Located in the lower portion of the pit beneath the grate I is a second grate M, doors N and O, Fig. 3, affording access to the grates as occasion may require. When required a fire may be maintained upon either or both of the grates, doors or dampers K, K' being elevated, as in the position shown in Fig. 1. A draft is, of course, induced in the chimney and as all the hoppers are closed under normal conditions, a draft will be induced through tubes L, the air thus drawn in passing throughout the length of the apparatus, over the excreta plate and tending to dry any matter thereon. The air then passes through port F, back beneath the excreta plate D, up through grate I to the stack. Grate I may be employed for burning the dried excreta and in any event all noxious gases will be destroyed by the action of the fire. When it is desired to thoroughly sterilize the excreta pan, dampers K and K' will be closed, as indicated in dotted lines, Fig. 1, the products of combustion passing along beneath pan D through port F, through the excreta chamber and thence to the stack through opening H. If need be, pipes L may be closed during this operation.

In Figs. 5, 6 and 7 a slightly modified form of apparatus is shown. In said construction a central furnace P is employed, having a grate Q and a second grate R located in the base of the pit. Ports or openings S, S' are provided in the opposite walls of the furnace and bring the latter into direct communication with two dry closets T, T', constructed upon the same general lines as that above described. Doors or dampers U, U', when elevated, close the ports, and also shut off the grate Q when they are swung down into their horizontal position. Ports V, V', located respectively at the ends of the excreta plates W, W', serve to connect the excreta chamber with the return-draft chamber beneath the plate, as in the former construction. Instead of the air duct being composed of a series of tubes, the walls of the furnace are made hollow, the air passing in through ports X, X' (see Fig. 7) and discharging into the dry closets above the excreta plates through ports or openings Y, Y', see Fig. 5. Air may also pass into the hollow wall of the furnace through the hollow bars of grate Q, see Fig. 6, thus not only causing the passing air to become heated but also keeping the grate bars cool. Doors Z, Z' afford access to grates Q and R. The furnace P communicates with stack *a* through an opening *b*, which is controlled by a damper *c*, see Fig. 6. When the damper is swung down to open the opening *b*, its outer end comes into line with the lower portion of an opening *d*, normally closed by a door *e*. Garbage may be introduced through opening *d*, damper *c* when swung down serving to direct the mass onto grate Q, where it may be burned.

If desired, grates M and R may be omitted, the fire being built directly upon the floor of the pit.

Having thus described my invention, what I claim is:

1. In a dry closet, the combination of an excreta-receiving plate; a furnace located adjacent to one end thereof; and means for inducing a current of air previously heated by the furnace into the closet above the excreta plate at the end adjacent to the furnace and causing it to pass first over the excreta plate, then under the same and finally through the furnace.

2. In a dry closet, the combination of an excreta chamber; a furnace in communication with one end of said chamber; and means working in conjunction with the furnace for inducing air previously heated by the furnace into one end of said excreta chamber and withdrawing it at the opposite end, the air finally passing through the furnace.

3. In a dry closet, the combination of an excreta chamber; a furnace in communication with one end thereof; and tubes or chambers heated by the furnace, said tubes or chambers opening into the excreta chamber, whereby heated air is caused to pass directly into the excreta chamber.

4. In a dry closet, the combination of a furnace; an excreta plate extending therefrom and forming an excreta chamber above and a return-draft chamber below said plate, said draft chamber opening into the excreta chamber at one end and at its opposite end into the furnace below the grate thereof; and means acted upon by the furnace fire for heating air and directly introducing said heated air into the excreta-receiving chamber.

5. In a dry closet, the combination of a main body provided with a series of normally-closed hoppers; an excreta-receiving plate located within the body and serving to divide the same into an upper compartment and a return draft flue; a furnace at one end of the body, said furnace being in communication with the return draft flue beneath the plate; and means acted upon by the furnace fire for heating air and directly introducing such heated air into the compartment above the excreta-receiving plate, said air passing over the plate thence downwardly into the return flue and then into the furnace.

6. In a dry closet, the combination of a main body provided with a series of normally-closed hoppers; an excreta-receiving plate located within the body; a furnace communicating with the spaces above and below the plate; means for closing communication between the space above the plate and the furnace; and means acted upon by the furnace for introducing heated air into the body above the excreta-receiving plate.

7. In a dry closet, the combination of a main body provided with a series of normally-closed hoppers; an excreta-receiving plate; a furnace communicating with the spaces above and below the plate; doors or dampers for closing the grate of the furnace and likewise closing communication between the furnace and the space above the excreta plate when the grate is opened; and a series of tubes extending through the furnace and discharging into the space above the excreta plate.

In testimony whereof I have signed my name to this specification in the presence of two subscribing witnesses.

FRED P. SMITH.

Witnesses:
　HORACE A. DODGE,
　FANNIE WISE.